United States Patent [19]
Gaumont et al.

[11] Patent Number: 6,118,539
[45] Date of Patent: Sep. 12, 2000

[54] OPTICAL-FIBER POLARIMETRIC SENSOR

[75] Inventors: Eric Gaumont, Yzeure; Michel Clement, Vernon; Ayoub Chakari; Patrick Meyrueis, both of Strasbourg, all of France

[73] Assignee: Societe Nationale d'Etude et de Construction de Moteurs d'Aviation - S.N.E.C.M.A., Paris, France

[21] Appl. No.: 09/470,486

[22] Filed: Dec. 22, 1999

[30] Foreign Application Priority Data

Dec. 30, 1998 [FR] France ................................ 98 16632

[51] Int. Cl.[7] .................................................. G01B 11/14
[52] U.S. Cl. .......................... 356/375; 356/367; 356/364
[58] Field of Search ................................. 356/375, 367, 356/364, 365, 366, 368, 372

[56] References Cited

U.S. PATENT DOCUMENTS

| | | |
|---|---|---|
| 4,358,678 | 11/1982 | Lawrence . |
| 4,773,753 | 9/1988 | Hirose et al. ............................. 356/345 |
| 5,054,922 | 10/1991 | Kersey ..................................... 356/345 |
| 5,552,889 | 9/1996 | Meier ....................................... 356/364 |

FOREIGN PATENT DOCUMENTS

| | | |
|---|---|---|
| 0 538 779 | 4/1993 | European Pat. Off. . |
| 0 621 461 | 10/1994 | European Pat. Off. . |
| WO 93 11404 | 6/1993 | WIPO . |

*Primary Examiner*—Frank G. Font
*Assistant Examiner*—Roy M. Punnoose
*Attorney, Agent, or Firm*—Weingarten, Schurgin, Gagnebin & Hayes LLP

[57] ABSTRACT

An optical-fiber polarimetric sensor for measuring the displacement of an object relative to a frame, the sensor comprising a measurement optical fiber secured, over a fraction of its length, both to a central point of the object and to first and second fixed points of the frame, means disposed at one end of the measurement fiber and serving to emit a light beam of determined polarization into said measurement fiber, means for exerting twist on the measurement fiber so as to modify the polarization of the light beam, and means disposed at another end of the measurement fiber and serving firstly to detect the resulting light beam and secondly to determine the displacement of the object by analyzing the polarization modified in this way, wherein said measurement fiber is stripped, over said fraction of its length, of the covering that imparts mechanical strength thereto, and it is slid into a deformable guide sheath fixed both to the rotary object and also to the frame. Preferably, the deformable guide sheath is made of fine steel, and it may lined with a flexible protective sheath.

13 Claims, 7 Drawing Sheets

OPTICAL-FIBER POLARIMETRIC SENSOR

FIELD OF THE INVENTION

The present invention relates to an optical-fiber polarimetric position sensor for use in severe environments, in particular cryogenic environments.

PRIOR ART

In practice, methods of measuring position by taking direct measurements on devices, such as plug valves, immersed in a cryogenic fluid, make it impossible to use electrical, capacitive or potentiometric type sensors, in general, and also make it impossible to use optical encoders. Such environments can be disturbed by temperature, by electromagnetic radiation, by high pressures, by vibration, and by the explosive nature of certain cryogenic fluids such as liquid hydrogen and oxygen. The types of sensor that can be taken into consideration are thus limited by the constraints induced by such critical environments. Nevertheless, an example of a solution to those difficulties is given by the Applicant's Patent Application FR 93 15 289 which relates to an optical-fiber angular position sensor operating by birefringence.

Unfortunately, in spite of its accuracy and its independence relative to electromagnetic disturbances, that type of optical-fiber sensor suffers from certain drawbacks, in particular because it is too sensitive to temperature and to pressure.

OBJECT AND DEFINITION OF THE INVENTION

The present invention thus proposes a novel optical-fiber polarimetric sensor making high-accuracy measurements possible and operating over a wide temperature range extending from cryogenic temperatures to high temperatures of about 400° C., regardless of any parasitic disturbances to which it might be subjected.

An object of the invention is also to propose a sensor in which the packaging of the optical fiber is such as to contribute to making it insensitive to temperature. Another object of the invention is to provide a sensor which is particularly simple to assemble both optically and mechanically without requiring any optimization pre-adjustment on a test bench. Yet another object of the invention is to provide a sensor that can be implemented either as an angular position sensor or as a linear displacement sensor (after a simple transformation has been performed).

These objects are achieved by an optical-fiber polarimetric sensor for measuring the displacement of an object relative to a frame, the sensor comprising a measurement optical fiber secured, over a fraction of its length, both to a central point (O) of the object and to first and second fixed points (A, B) of the frame, means disposed at one end of the measurement fiber and serving to emit a light beam of determined polarization into said measurement fiber, means for exerting twist on the measurement fiber so as to modify the polarization of the light beam, and means disposed at another end of the measurement fiber and serving firstly to detect the resulting light beam and secondly to determine the displacement of the object by analyzing the polarization modified in this way, wherein said measurement fiber is stripped, over said fraction of its length, of the covering that imparts mechanical strength thereto, and it is slid into a deformable guide sheath fixed both to the rotary object and also to the frame.

With the structure of the invention, any rigid contact between the measurement fiber and its supports is eliminated, thereby making the measurements totally independent of thermal stresses.

Preferably, the deformable guide sheath is made of fine steel, and said sheath may be lined with a flexible protective sheath.

In a particular embodiment of the polarimetric sensor of the invention, in which embodiment the emission means emit a linearly-polarized light beam, pressure means are placed at the outlet of the emission means and serve to cause the polarization to be rotated selectively. The pressure means include a plane piezoelectric element controlled on the basis of a voltage, and serving to apply a radial force selectively to the measurement fiber, so as to obtain, at the outlet of the pressure means, a linear polarization in the 45° direction, the polarization at the inlet of the pressure means being assumed to be linear and in the 0° direction.

The light beam emission means and detection means, and the means for determining the displacement of the object are mounted in a box filled with a dry atmosphere and communicating directly with an inside volume of said deformable guide sheath. By means of this configuration, external disturbances have very little influence on measurement.

Advantageously, the box is maintained at constant pressure by a pressure compensation system having a piston or a diaphragm.

In a variant embodiment, in which the light beam emission means and the light beam detection means, and the means for determining the displacement of the object are distant from said measurement fiber, one of the two ends of said measurement fiber is connected to said transmit means via an "emission" fiber, and the other of its ends is connected to said detection means via a "detection" fiber, and the inside volume of said deformable guide sheath communicates directly with the inside volume of a box filled with a dry atmosphere and maintained at constant pressure by a pressure compensation system having a piston or a diaphragm.

Preferably, the box is fixed to the frame by point fixing means that are poor conductors of heat, and it includes walls formed of a thermally-insulating material.

The box further includes an isostatic support advantageously made of a ceramic material and provided with two holes for receiving said emission and detection fibers and for maintaining them in contact with said two ends of the measurement fiber. The ends of the measurement fiber are held in said support either by filling said holes with ceramic cement or by depositing metal in said holes by plasma spraying.

BRIEF DESCRIPTION OF THE DRAWINGS

Other characteristics and advantages of the present invention appear more clearly from the following description given by way of non-limiting example, and with reference to the accompanying drawings, in which.

DETAILED DESCRIPTION OF A PREFERRED EMBODIMENT

Figure 1:
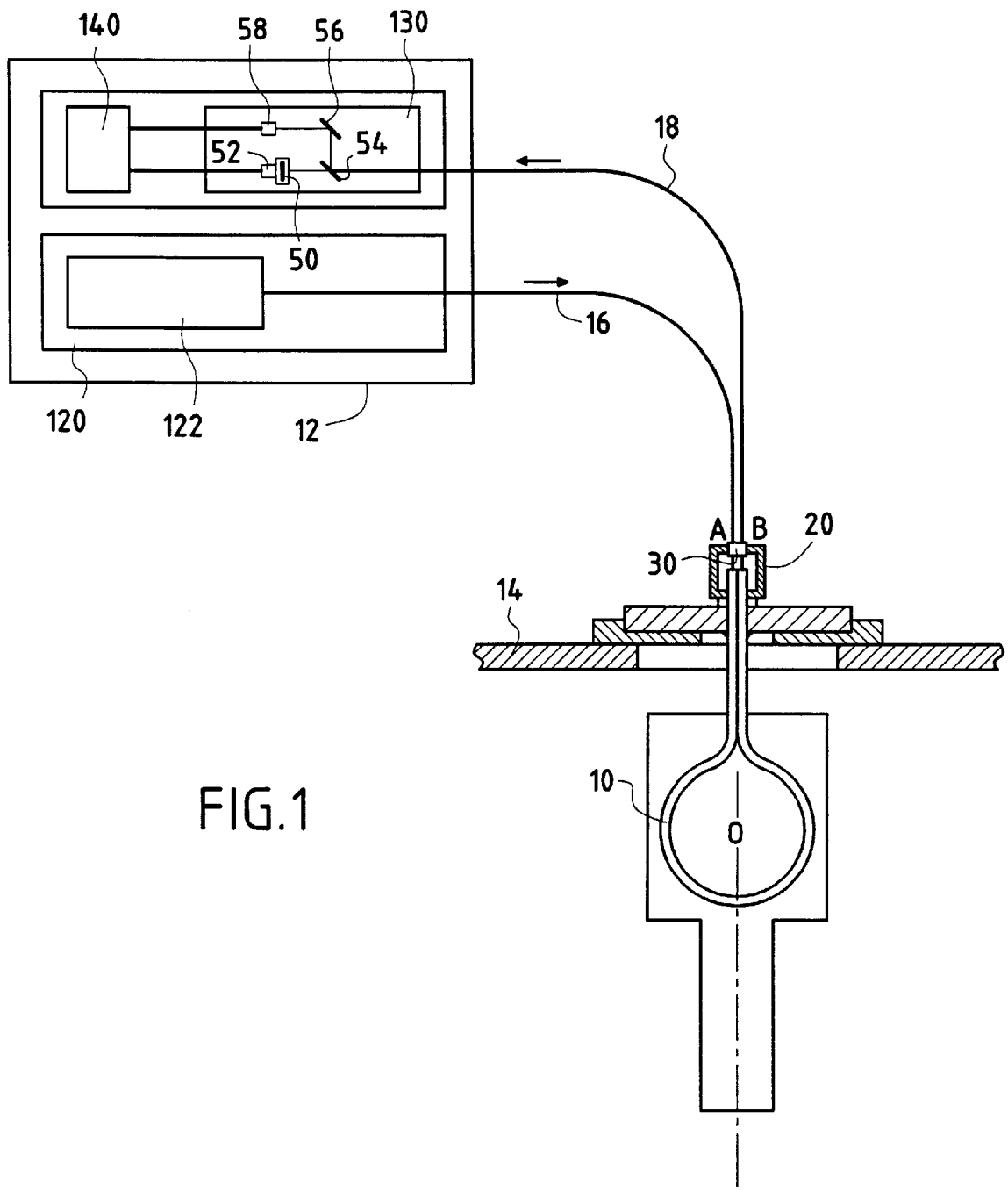
FIG. 1 shows a first embodiment of a sensor of the invention.

A first example of an optical-fiber polarimetric sensor of the invention, as applied to measuring the angular displacement of a plug valve operating in cryogenic surroundings is shown in FIG. 1.

This sensor is essentially made up of three elements: a sensitive measurement fiber 10 fixed in a measurement zone to the rotary object (the plug of the valve in this example) whose displacement is to be measured, an optoelectronics box 12 for emitting and detecting a measurement light signal, which box is, in principle, distant from the measurement zone proper, and is fixed, for example, to a frame 14, and two link fibers, namely an emission fiber 16 and a detection fiber 18, for go-and-return conveyance of the measurement light signal between the optoelectronics box an the measurement fiber.

In the invention, the sensitive fiber is provided, in the measurement zone, with sheathing that is specially designed to withstand large temperature and pressure disturbances. For this purpose, the fiber, as stripped of its outer covering (e.g. made of polymide) that is necessary to impart strength to it, is slid into a deformable guide sheath (e.g. made of fine steel) secured firstly to the frame at two points A and B, whose positions may be varied depending on the chosen configuration, and secondly to the object at a point O on the axis of rotation of said object. The loose guiding provided by the sheath thus enables the fiber to describe a predefined path without breaking. By securing the outer sheath in this way, rather than securing the fiber itself directly, it is possible to eliminate any rigid contact in the measurement zone, the sensitive measurement fiber than being bonded neither to the sheath nor to the frame and the rotary object at any point, unlike in the prior art. The bonding points via which the fiber is bonded to the frame are offset to the outside of the measurement zone so that the measurements are properly independent from temperature stresses, especially at cryogenic temperatures. The deformable sheath may however be lined with a flexible protective sheath made of Teflon (a trademark of Du Pont de Nemours). For temperatures in the atmospheric range, and typically [+70° C. to −70°C.], the measurement fiber may optionally be covered with a covering of very low thickness, of less than or equal to 1 micron, and made of a metal material suitable for the temperature environment (or a polymide). However, for more critical temperature ranges, such as cryogenic temperatures, it is essential for the fiber used to be totally stripped in the measurement zone so as to be protected only by the deformable guide sheath, in loose manner. In any event, depending on the desired performance, the measurement fiber may be either a standard telecom-type monomode optical fiber or a "spun" type fiber (having very low birefringence).

Depending on the use being considered, the sensitive measurement fiber may follow a plurality of possible paths over the frame and over the rotary object by being guided by the sheath (FIG. 2).

In general, at the point O of the rotary object, a closed loop is always formed, which loop makes it possible to obtain an angular measurement range of 45° or 90° due to the linear birefringence that it induces in the fiber by curvature. The diameter of the circular loop may take various values that are predetermined to minimize the effects on the measurement of the birefringence induced in the fiber by large temperature fluctuation. For example, the dimensions of the loop may be calculated so that each loop induces a linear birefringence whose phase offset is a multiple of $\pi/2$ so that it is equivalent to a quarter-wave plate. In this first case, the polarization at the inlet of the loop must be circular and the angular measurement range is 90°. Similarly, the dimensions of the loop may be determined so as to induce linear birefringence whose phase offset is a multiple of $\pi$, so that it is equivalent to a half-wave plate. In this second case, the polarization at the inlet of the loop must be linear, and the angular measurement range is only 45°.

Figure 2A:
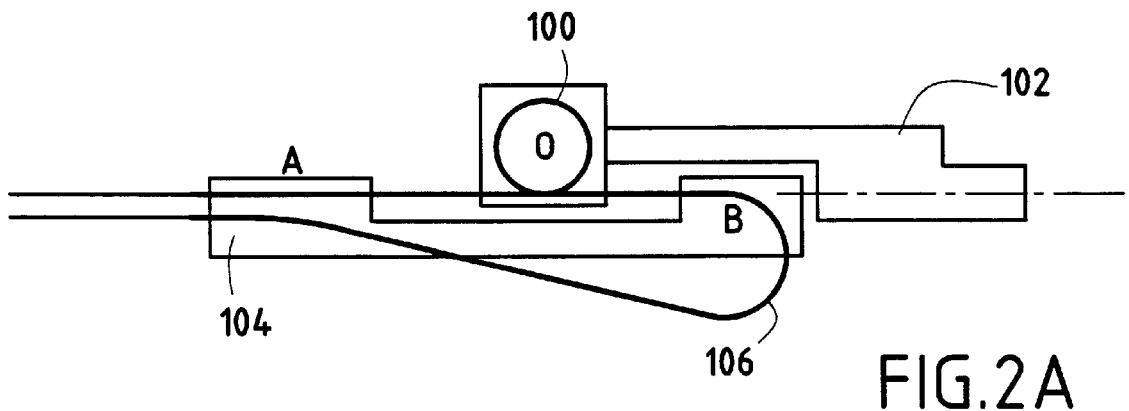
FIGS. 2a, 2b, and 2c show three possible embodiments of the measurement loop shown in FIG. 1.

In a first configuration shown in FIG. 2a, the loop 100 is formed at the point O of the rotary object 102 midway between the points A and B of fixing to the frame 104, and, preferably, a return half-loop 106 is added so that the measurement fiber is configured in probe-like manner. The return half-loop is formed on the frame after the closed loop, and its diameter is determined such that the initial curvature-induced birefringence is a multiple of $\pi$, the half-loop thus being equivalent to a half-wave plate, thereby minimizing the effect of temperature fluctuation.

Figure 2B:
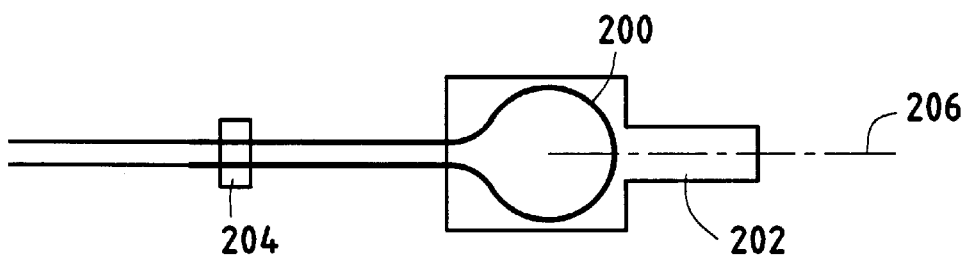

In a second configuration shown in FIG. 2b, which may be referred to as a "bow loop" configuration, a single loop 200 is fixed to the rotary object 202, with the ends of the loop arriving and returning on the same side of the frame 204. The axis of rotation 206 of the loop is situated on the axis of the two output strands (the two ends of the sheath) and on the diameter of the loop extending said axis.

Figure 2C:
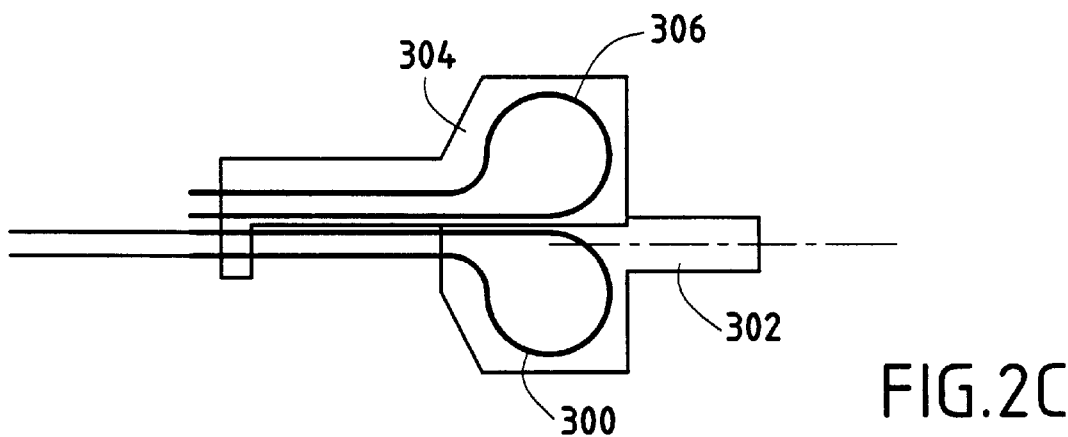

In a third configuration shown in FIG. 2c, which may be referred to as an "eccentric bow loop" configuration, a second loop 306 is provided that is also mounted in a deformable sheath fixed relative to the frame 304, into which sheath a second measurement fiber is slid serving as a reference fiber that is sensitive to the same parasitic disturbances (extraneous to the rotary motion) as the measurement fiber 300 fixed to the rotary object 302. The calibration of the polarimetric response of the second fiber may also serve as a temperature sensor integrated in the angular position sensor.

The sensitive portion of the sensor may be placed in an environment that is subjected to large disturbances in terms of pressure, of vibration, and above all of temperature, with temperatures ranging from cryogenic to temperatures at the mechanical limit of the fiber. In addition, the measurement zone generally has non-zero humidity. Thus, in the invention, provision is made to place a specially-designed fiber connector at the inlet of the measurement zone where the link fibers 16 and 18 are inserted.

Figure 3:
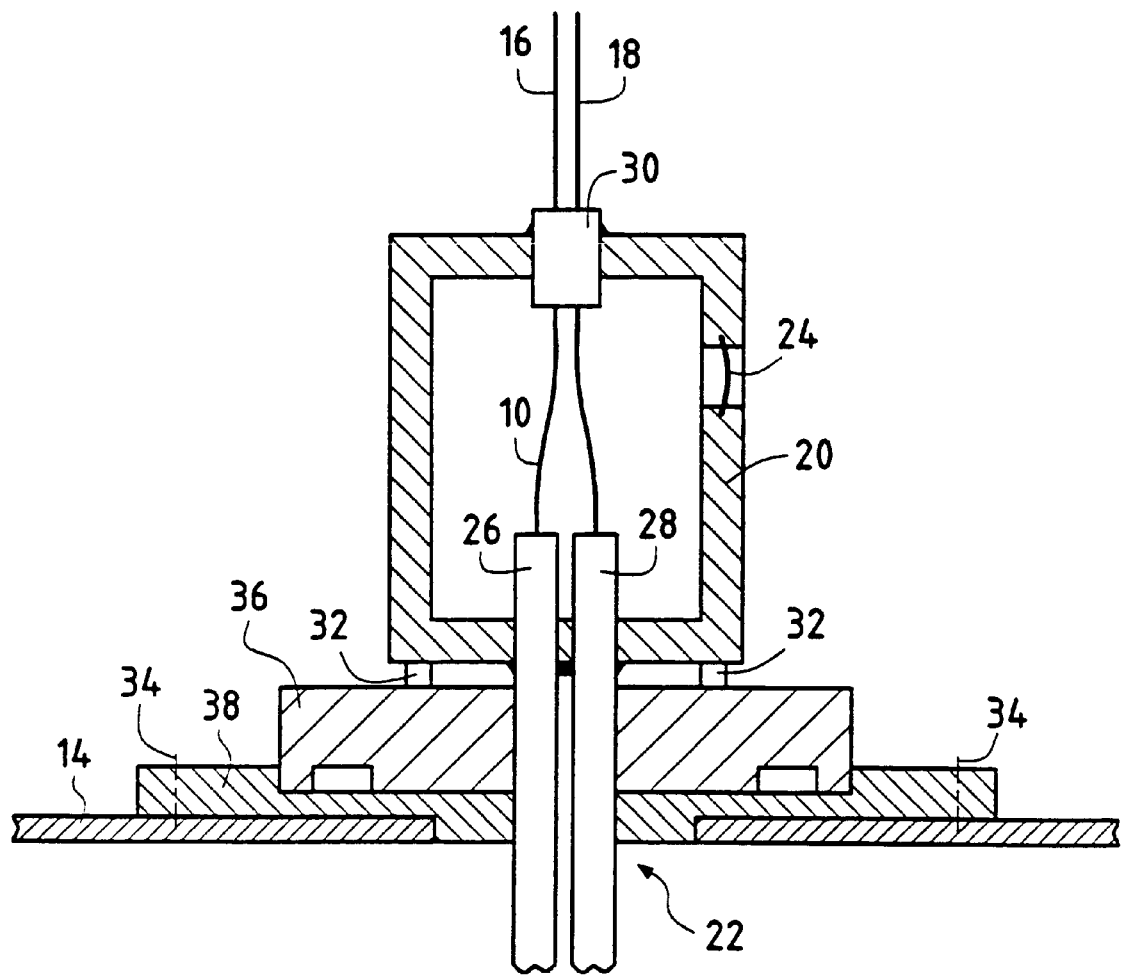
FIG. 3 shows a connector element for connecting the measurement fiber shown in FIG. 1.

The connector shown in FIG. 3 is in the form of a small box 20 organized to receive the measurement fiber 10 coming from the measurement zone and to connect it to the link fibers which convey the measurement light signal, while limiting the stresses exerted on said measurement fiber. The box is in direct communication with the inside volume of the deformable sheath 22 for guiding the measurement fiber, and it is filled with an inert gas (e.g. nitrogen), creating a dry atmosphere in order to prevent any ice from forming on the fiber. It is equipped with a device making it isobaric, such as, for example, a deformable diaphragm 24 for taking up the compression/decompression due to changes in temperature in the enclosure of the guide sheath. The walls of the box are designed to be as isothermal as possible by using a thermally-insulating material, and so as to have low thermal conduction. At one of its ends, the box is provided with first openings 26, 28 for passing the two ends of the guide sheath, and, at its other end, in alignment with the axis of the sheath, an isostatic support such as a ceramic ring 30 is disposed, which support is provided with two small holes for passing and bonding the two ends of the measurement fiber, with very low thermal expansion. The purpose of the bonding, which must be as uniform as possible, is to limit the thermal expansion of the materials used, and above all the thermal contraction thereof for negative temperature variations. Thus, each hole must have a diameter that is at least 5 times greater than the thickness of the fiber that it receives, so that the positioning of the fiber on the axis of the hole is achieved without difficulty. The additional (bonding) material may be chosen as a function of various criteria such as ease of manufacture, field of use, etc. A simple and elegant solution is to fill the hole with ceramic cement (silica powder and sodium silicate). Another solution, which is however more technological, consists in depositing metal by plasma spraying. However, it should be noted that if the atmospheric humidity is zero, a thermally-insulated support and a single through hole in a ceramic block then suffice.

The box 20 is fixed to the frame 14 by point fastenings or fixings 32, 34 limiting thermal conduction. Two advantageously superposed connection plates are also provided, namely one plate 36 for enabling the measurement loop 10 to be rotated relative to the frame 14 on securing the sheath at O to the rotary object (i.e. so as to set rotation zero), and another plate 38 for coupling to the frame. The sizes and thicknesses of the plates are such as to provide an anti thermal conduction configuration (thin layers of air or insulating layers, limited thermal bridges, etc.). All of the sealing means on the link fibers (in the ceramic ring or tube) and on the guide sheath are of the static type, i.e. no sealing needs to be provided on a rotary element.

Returning to FIG. 1, the distant optoelectronics box 12 includes both emission means 120 for emitting a measurement light signal and also detection means 130, 140 for detecting it and processing it after it has passed through the measurement zone.

The light is emitted from an optoelectronic component known per se and acting as a monochromatic light source that is polarized in a fixed state (either linear or circular), and that is thermally stabilized. The component may, for example, comprise a semiconductor laser-emitter diode 122 mounted on a thermal-regulation Peltier element. It may also incorporate two other elements (not shown), namely a thermistor for measuring the temperature of the laser-emitter diode, and a photodiode for measuring the intensity of the injected light.

Three configurations may be considered for connecting the light source to the measurement zone.

Figure 4A:
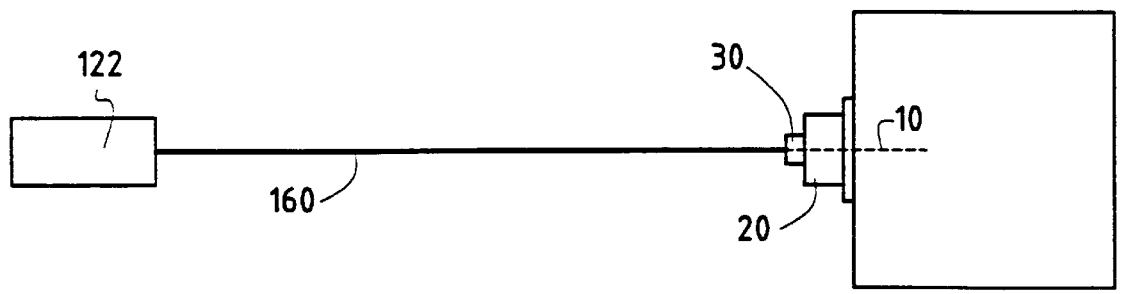
FIGS. 4a, 4b, and 4c show three possible embodiments of the go link fiber shown in FIG. 1.

In a first configuration (see FIG. 4a), the laser-emitter diode 122 is connected directly (in pigtailed mode) along a predetermined axis to a first end of a linear-states polarization-maintaining fiber (PMF) 160 of the "bow tie" type, for example, conveying linearly-polarized monochromatic light without modifying it. The other end of the fiber is then connected to the measurement fiber 10 at the ceramic tube 30 of the connector box 20. This configuration is the simplest for obtaining an angular measurement range of 45° or less, for a basic measurement accuracy of less than one tenth of one degree (0.1°), and minimum thermal effects.

Figure 4B:
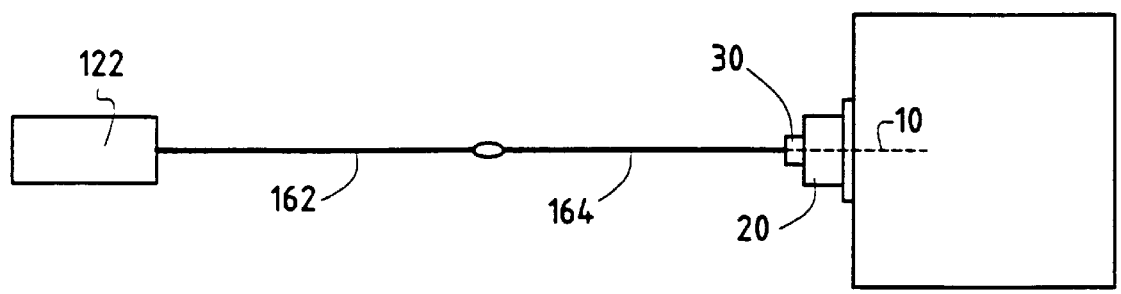

In a second configuration (see FIG. 4b), the laser-emitter diode 122 is connected directly to a first end of a telecom-type monomode fiber 162 along which a loop equivalent to a quarter-wave plate is provided for selecting a circular polarization state. This is preferably performed over a short distance immediately after the diode, along a straight line, and in surroundings in which the temperature is stable compared with the temperature conditions to which the measurement zone can be subjected (e.g. it can be subjected to cryogenic temperature variations). optionally, depending on the distance to be travelled, the other end of the fiber may be connected by fusion to another monomode optical fiber 164 of the circular-states polarization-maintaining fiber that then extends to the measurement fiber 10 at the ceramic tube 30. This configuration is particularly well suited to obtaining an angular range of 90° and minimum thermal effects.

Figure 4C:
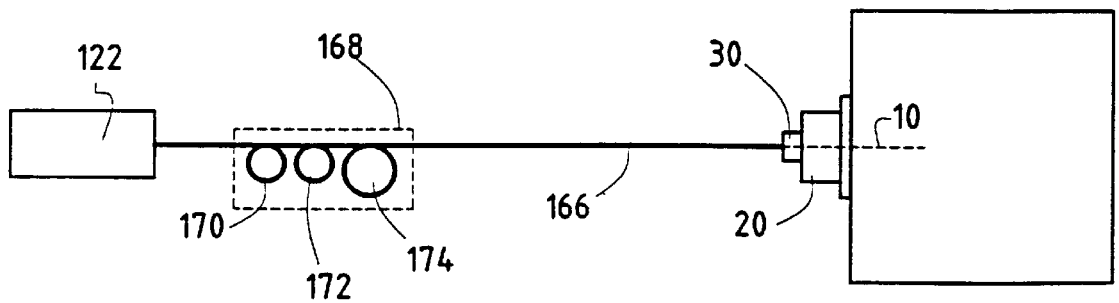

In a third configuration (see FIG. 4c), the laser-emitter diode 122 is connected directly to a first end of a standard fiber 166 on which a polarization controller 168 is formed with three loops. The first loop 170 has a diameter calculated so that the first loop is equivalent to a quarter-wave plate enabling a linear state to be obtained from any polarization. The second loop 172 has a diameter calculated so that the second loop is also equivalent to a quarter-wave plate so as to obtain any polarization state on a given polarization plane. The diameter of the third loop 174 is calculated so that the third loop is equivalent to a half-wave plate so as to select any polarization direction from the polarization state selected by the second loop 172. This fiber 166 then extends to the measurement fiber 10 at the ceramic tube 30. With this configuration, various polarizations may be selected for injection into the measurement fiber, which offers great flexibility in choosing the measured angular range.

To obtain a measurement range that is even broader than the range made possible by the above-mentioned versions, it is possible, by filling in the periodic "gaps" in the sensitivity of the angular response of each measurement fiber, to associate two measurements whose angular ranges are offset.

A first solution consists merely in doubling the measurement fiber by using two light sources. A second, more advantageous, solution consists in using an X-shaped PMF coupler placed between the laser-emitter diode 122 and the go link fiber 16. One of the strands of fiber of the coupler is connected directly to the laser-emitter diode, the other two opposite strands of fiber then being used as emission fibers for emission to the measurement fiber. The polarization at the inlet of each emission fiber is linear and oriented in a direction that is optimized so that the angular responses are complementary. This configuration having a coupler does however assume that the optoelectronics box 12 offers good temperature stability.

Figure 5:
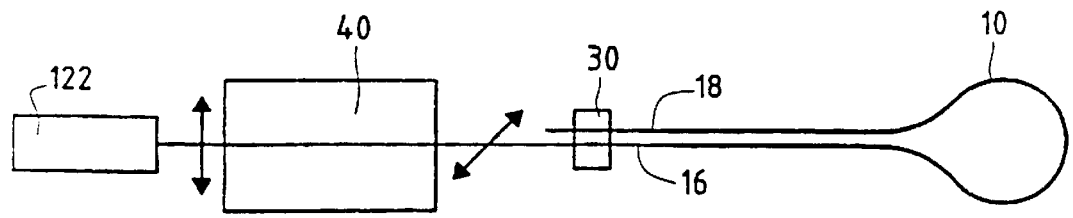
FIG. 5 shows an embodiment of a sensor of the invention having a wider measurement range.
Figure 6:
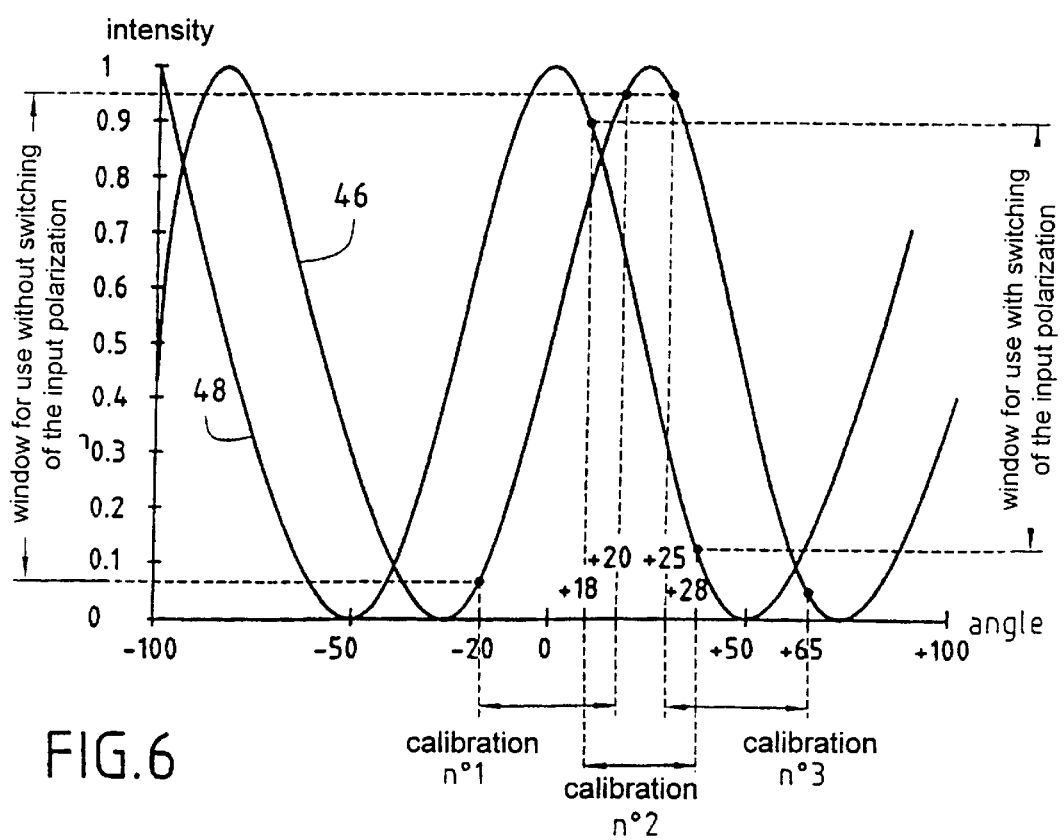
FIG. 6 shows two response curves of a measurement sensor as shown in FIG. 5.

A third solution shown in FIG. 5 and which can be implemented when the polarization is linear at the outlet of the laser-emitter diode, consists in switching the polarization at the inlet of the measurement zone so as to double the initial ideal angular range (but tripling, or quadrupling to increase the measurement range to 180° is also possible). For this purpose, pressure means 40 are placed on the emission optical fiber 16, at the outlet of the emitter diode 122, which pressure means exert radial mechanical stress on the fiber in a well-determined direction and with a well-determined amplitude, so as to "switch" the original linear polarization (of indexed direction 0°) to another polarization of indexed direction 45°. The purpose of obtaining this 45° linear polarization by performing switching is, by transforming the primary response of the sensor into a secondary response then available in an angular range offset by 22.5°, to mitigate the sensitivity gap in the first measurement range because, as shown in FIG. 6, the response signal after switching recovers sensitivity that it would have lost without this action being taken on the fiber (one signal is active while the other is in an insensitive period of the angular response of the fiber).

Figure 5A:
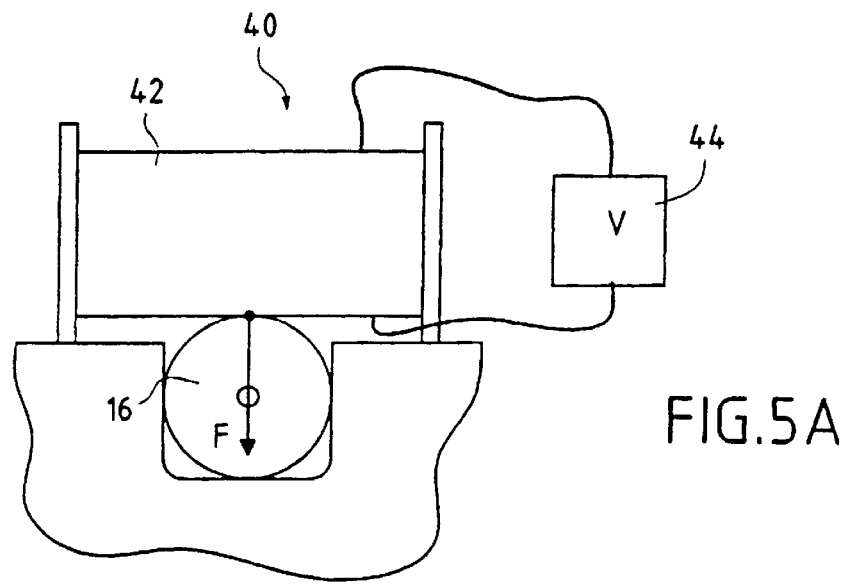
FIG. 5a shows an embodiment of polarization-switching means implemented in the structure shown in FIG. 5.

FIG. 5a shows, by way of non-limiting example, an embodiment of the pressure means 40 for rotating the polarization into a direction oriented at 45°. The principle is to generate in the fiber a linear birefringence equivalent to that of a half-wave blade whose main axis is oriented in a direction at 22.5° from the output polarization of the laser-emitter diode, and which induces a phase offset equal to $\pi$ between the two linear characteristic modes of this birefringence. For this purpose, a radial force must be applied to the fiber 16 as laid in a groove provided in a straight line in a direction at 22.5° relative to the linear polarization direction at the outlet of the laser diode. This force may be applied very simply by means of a plane piezoelectric element 42 excited by means 44 delivering a squarewave voltage (V) at a frequency that is high relative to the rotary motion of the object. Optically, the force necessary for obtaining the phase offset by $\pi$ is given by the following relationship (for a silica/silica fiber):

$$F=\pi*\lambda*r*E*\tau/8*C$$

where k is the wavelength of the light, r is the radius of the fiber, C is the elastooptical constant of the silica of the fiber, E is the Young's modulus of the silica, and $\tau$ lies in the range 1 to $8/\pi$ and is a correction term resulting from the fact that the contact of the force F is not at a point.

The principle of controlling the polarization is explained with reference to FIG. 6 which shows the response signals of the sensors as obtained in the two above-mentioned measurement ranges. The curve 46 represents the response signal of the sensor (measurement of the angle as a function of the collected intensity) in the absence of any switching of the polarization. It is a periodic signal, of the sine squared ($\sin^2$) form, with a period of 97.30°. Thus, if the angular position of the winding plane of the measurement loop 10 is indexed at 0°, without parasitic twist, it is then possible to define a first calibration range over a rising linear portion of the curve, e.g. from −20° to +20°, in which range the measurement offers maximum sensitivity (at the maxima and minima of the curve, because of the shallowness of the slope, the sensitivity is reduced and falls to zero). The response of the sensor after the polarization has been switched is illustrated by the curve 48. it can be observed that, because of the angular offset, the second curve has high measurement sensitivity (the curve has a steep slope) at the angular positions for which the first curve has low sensitivity. A second calibration range can thus be defined, e.g. from +18° to +28° (a slight overlap of a few degrees is preferable in order to avoid edge effects), the width of the second calibration range preferably being significantly smaller than the width of the first calibration range (the sensitivity of the second signal is lower and said second signal is more sensitive to temperature). However, in order to avoid having too many calibration ranges, the second calibration range should not be too narrow. At the limit, it should however be noted that the presence of a single second calibration range suffices to double the initial angular measurement range (i.e. the measurement range without switching). Then, on a falling linear portion of the first curve, there is a third calibration range, e.g. from +25° to +65°. By means of very simple data processing by windowing (it is advantageous also to implement synchronous detection to improve the filtering out of the measurement noise), known to the person skilled in the art, it is thus possible to control the polarization switching such that the measurement signal goes successively from one calibration range to another as a function of angular position, while retaining maximum sensitivity.

The signal containing the polarimetric information making it possible to deduce the angular value is detected at the outlet of the return link fiber 18 via a polarizer 50 oriented on a predefined axis and followed by a first receiver photodiode 52. However, immediately before the polarizer, it is possible to interpose a beam-splitting element 54, 56 for further collecting the light intensity on a second photodiode 58 independently of the polarization of the light. When the light travels over a path constrained to include too much curvature (radius of curvature of about 5 mm), this makes it possible to deduce the thermal variations in light intensity throughout the path. When the link fibers are less curved, measuring the current of the photodiode incorporated in the laser-emitter diode, which current is proportional to the light intensity injected into the go link fiber 16, suffices to deduce any fluctuations in the laser diode. The angle of rotation of the object is then determined in a data-processing unit 140 on the basis of the collected light intensity variations.

Figure 7:
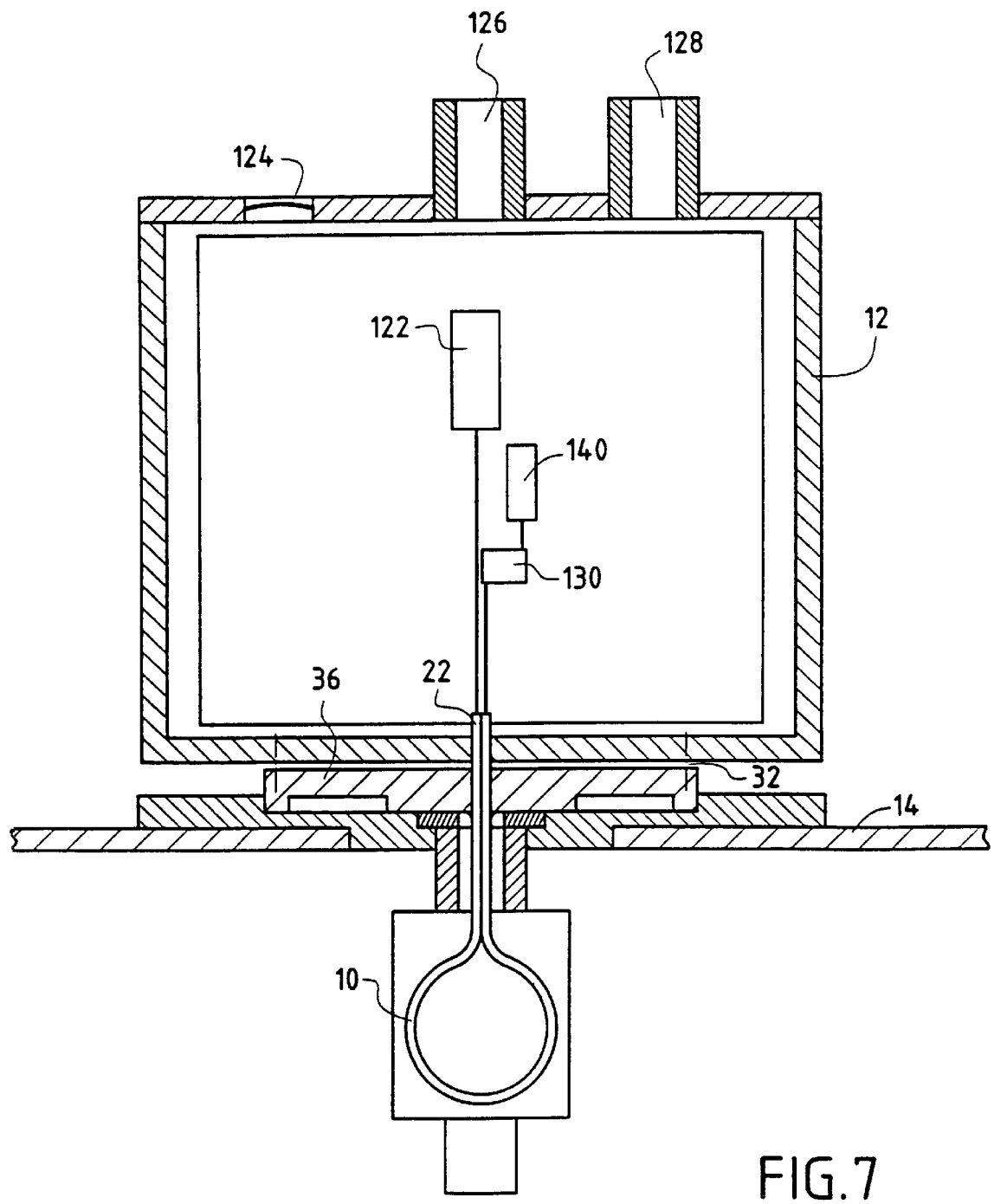
FIG. 7 shows a second embodiment of a sensor of the invention.

A second embodiment of a sensor of the invention is shown in FIG. 7. This embodiment has a one-piece structure (without the emission and the detection being separate and at a distance). In this case, the go and return link fibers are no longer necessary since the measurement fiber is connected directly to the laser-emitter diode and to the detection means.

The sensor is made up essentially of the measurement fiber 10 which is connected directly to the optoelectronics box 12. As in the first embodiment, the optoelectronics box contains a temperature-stabilized optoelectronic component 122 acting as a monochromatic light source of determined polarization, e.g. a semiconductor laser diode mounted on a thermal-regulation Peltier element. A thermistor for measuring the temperature of the laser diode, and a photodiode for measuring the light intensity injected into the measurement fiber are, in principle, incorporated into the component. The box also contains the detection component 130 for detecting the measurement signals, which component incorporates a polarizer and separator plates. The microcontroller 140 for processing the data (synchronous detection, analog-to-digital conversion, etc.) and a circuit (not shown) for powering all of the components are further also provided in this box.

In the second embodiment, the optoelectronics box acts as the above-mentioned isothermal and isobaric fiber connector box. It is therefore filled, while it is being manufactured, with a dry atmosphere, e.g. an inert gas, the type of which is chosen to suit the use to be made of the sensor, and it communicates directly with the internal volume of the deformable guide sheath 22. The pressure of these intercommunicating volumes is maintained constant either, in a simple case in which the pressure outside the box is stable, by a system 124 of pressure compensation of the diaphragm or piston type disposed on the box and designed to take up the pressure variations due to temperature variations in the two intercommunicating volumes, or, in a more complex case when the pressure outside the box fluctuates significantly, by sealing the box and by regulating the temperature of the volume of gas over the temperature range to which it is subjected (typically the atmospheric range −70° C. to +70° C.). The box is filled with gas via couplings 126, 128 provided for this purpose and then closed off.

As in the first embodiment, the box is fixed to the frame (via connector plates) by means of point fasteners 32, 34 that are poor conductors of heat.

The measurement method implemented with the sensor of the invention is baed on the variation in the optical polarization properties of the light at the outlet of the measurement fiber as a function of the rotation of said fiber. The measurement optical fiber is subjected, over the length between the two fixing points A and B, to a relatively complex optical birefringence phenomenon resulting both from the linear birefringence induced by the curvature of the loop, and from the circular birefringence induced by the twist of the fiber along its axis. Because of its over-general nature, this combined phenomenon, referred to as "elliptical birefringence", is often relinquished in favor of the specific cases of linear birefringence and circular birefringence. However, accurate modeling of these phenomena along the measurement optical fiber has shown that adjusting certain parameters leads to extreme minimization of the modification of the intensity of the signal at the outlet of the detection means.

It is then possible for the calculation of the measurement of the rotation angle as a function of temperature to be corrected easily, and the measurement method thus becomes insensitive to temperature fluctuations. The thermal optimization parameters are as follows:

the polarization $P_e$ of the light in the fiber at the inlet of the measurement zone must be circular or linear;

the dimensions of the loop, regardless of its exact shape, are determined so that the loop induces a phase offset between the two modes (slow and fast) of the polarization of the light along the fiber, which phase offset is as follows:

$\Delta\phi_1=(2n-1) \cdot \pi/2$ if the upstream polarization $P_e$ is circular; or $\Delta\phi1=(2n-1) \cdot \pi$ if the upstream polarization $P_e$ is linear;

the orientation direction of the polarizer is determined as a function of the polarization at the inlet of the measurement zone, and of the direction of the plane of curvature of the loop of the measurement fiber. It may take two values: either in alignment with the direction of the plane of curvature of the fiber, or at 90° thereto; and the wavelength of the source is preferably chosen to be as long as possible so as to minimize the thermal effects on the response. A wavelength of about 1300 nm or even longer makes it possible either to reduce the dimensions of the loop while retaining equal performance, or else to reduce the thermal effects while retaining comparable loop dimensions.

This measurement method may be implemented in the form of the following three steps:

a) injecting polarized light into one end of an "emission" first link fiber configured to provide selective control of the polarization at the inlet of the measurement fiber to which it is connected;

b) detecting polarization changes induced by the twist of the measurement fiber at the end of a "detection" second link fiber connected to the outlet of the measurement fiber; and c) determining the displacement of the object by comparing the polarization measured in this way with predetermined values obtained after calibration calculation has been performed as a function of predetermined displacements.

Naturally, in the one-piece version of the sensor, the injection and the detection performed in steps a) and b) are effected directly at the two ends of the measurement fiber.

Advantageously, it is possible to add the following additional step:

d) correcting the very low thermal modulation of the offset and of the gain of the angular response by means of calibration calculation, as a function of the information on the temperature along the fiber.

And also, with a view to overcoming any fluctuations in the power of the light source and of the measurement fiber, it is possible to add the following step:

e) measuring the intensity of the light signal, independently of its polarization, as collected at the end of the detection fiber.

By its structure, the present invention is particularly suitable for many uses. It can be implemented for measuring either an angular displacement of an object rotating relative to a frame, or even a linear displacement of an object moving in translation, while remaining insensitive to pressure disturbances and to temperature disturbances over wide ranges extending from cryogenic temperatures to about 400° C. In this second case, it is necessary to transform the rotation of the object into a linear displacement by means of a suitable mechanical transmission such as a connection rod with no clearance. Depending on the dimensioning of this transmission, the measurement range extends over a few millimeters or over a few centimeters or more.

Figure 8:
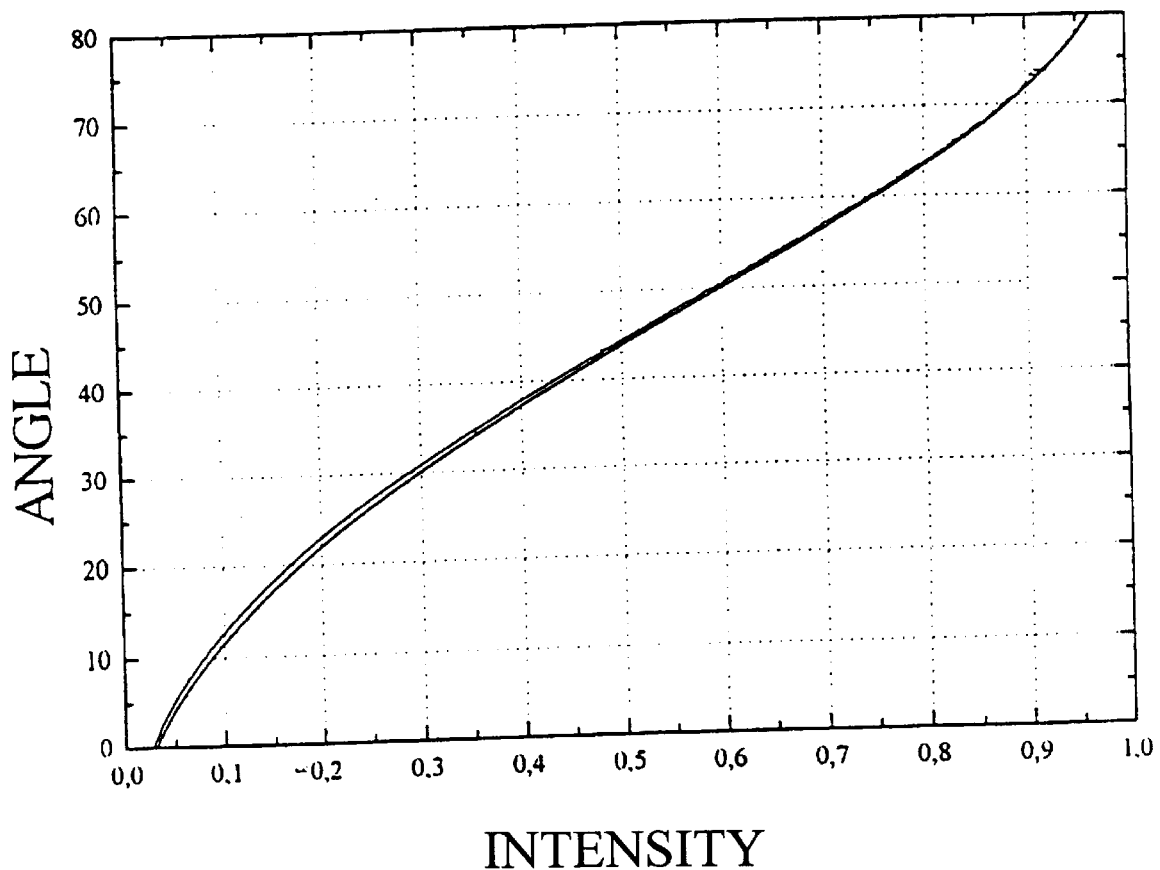
FIG. 8 shows, for two distinct temperatures, curves indicating how angular displacement varies as a function of measured intensity.

FIG. 8 shows two experimental curves of the measurement signal recorded at the outlet of a sensor of the invention. One of the curves 70 was recorded at ambient temperature, T=20° C., and the other curve 72 was recorded at the temperature of liquid nitrogen, T=−200° C.

In particular, the sensor of the invention is especially suitable for measuring the rotation of a cryogenic-fluid valve subjected to high pressures and to disturbances of all types, including intense vibrations, magnetic fields, etc. Similarly, it may be implemented for measuring the displacement of a rail switch or "points" subjected to strong vibrations, to electromagnetic disturbances, and to temperature fluctuations of up to 100° C. It may also be implemented for measuring the rotation of aircraft flaps under difficult atmospheric and magnetic conditions, or else for measuring the rotation of solar panels subjected to atmospheric temperature fluctuations. In practice, the sensor of the invention is especially recommended for all uses in which disturbances extraneous to the rotation of the object are strong and numerous, e.g. temperature, vibration, and pressure disturbances.

What is claimed is:

1. An optical-fiber polarimetric sensor for measuring the displacement of an object relative to a frame, the sensor comprising a measurement optical fiber secured, over a fraction of its length, both to a central point of the object and to first and second fixed points of the frame, means disposed at one end of the measurement fiber and serving to emit a light beam of determined polarization into said measurement fiber, means for exerting twist on the measurement fiber so as to modify the polarization of the light beam, and means disposed at another end of the measurement fiber and serving firstly to detect the resulting light beam and secondly to determine the displacement of the object by analyzing the polarization modified in this way, wherein said measurement fiber is stripped, over said fraction of its length, of the covering that imparts mechanical strength thereto, and it is slid into a deformable guide sheath fixed both to the object that rotates and also to the frame.

2. A polarimetric sensor according to claim 1, wherein said deformable guide sheath is made of fine steel.

3. A polarimetric sensor according to claim 2, wherein said deformable guide sheath is lined with a flexible protective sheath.

4. A polarimetric sensor according to claim 1, in which the emission means emit a linearly-polarized light beam, said polarimetric sensor further comprising pressure means placed at the outlet of the emission means and serving to cause the polarization to be rotated selectively.

5. A polarimetric sensor according to claim 4, wherein said pressure means include a plane piezoelectric element controlled on the basis of a voltage, and serving to apply a radial force selectively to the measurement fiber, so as to obtain, at the outlet of the pressure means, a linear polarization in the 45° direction, the polarization at the inlet of the pressure means being assumed to be linear and in the 0° direction.

6. A polarimetric sensor according to claim 1, wherein said light beam emission means and detection means, and said means for determining the displacement of the object are mounted in a box filled with a dry atmosphere and communicating directly with an inside volume of said deformable guide sheath.

7. A polarimetric sensor according to claim 6, wherein said box is maintained at constant pressure by a pressure compensation system having a piston or a diaphragm.

8. A polarimetric sensor according to claim 1, wherein, with said light beam emission means and said light beam detection means, and said means for determining the displacement of the object being distant from said measurement fiber, one of the two ends of said measurement fiber is connected to said transmit means via an "emission" fiber, and the other of its ends is connected to said detection means via a "detection" fiber, and the inside volume of said deformable guide sheath communicates directly with the inside volume of a box filled with a dry atmosphere and maintained at constant pressure by a pressure compensation system having a piston or a diaphragm.

9. A polarimetric sensor according to claim 6, wherein said box is fixed to the frame by point fixing means that are poor conductors of heat.

10. A polarimetric sensor according to claim 6, wherein said box includes walls formed of a thermally-insulating material.

11. A polarimetric sensor according to claim 8, wherein said box further includes an isostatic support advantageously made of a ceramic material and provided with two holes for receiving said emission and detection fibers and for maintaining them in contact with said two ends of the measurement fiber.

12. A polarimetric sensor according to claim 11, wherein said ends of the measurement fiber are held in said support by filling said holes with ceramic cement.

13. A polarimetric sensor according to claim 11, wherein said ends of the measurement fiber are held in said support by depositing metal in said holes by plasma spraying.

* * * * *

UNITED STATES PATENT AND TRADEMARK OFFICE
CERTIFICATE OF CORRECTION

PATENT NO. : 6,118,539
DATED : September 12, 2000
INVENTOR(S) : Eric Gaumont et al.

It is certified that error appears in the above-identified patent and that said Letters Patent is hereby corrected as shown below:

<u>Column 7,</u>
Line 28, "k" should read -- $\lambda$ --.

Signed and Sealed this

Twenty-fifth Day of December, 2001

*Attest:*

JAMES E. ROGAN
*Director of the United States Patent and Trademark Office*

*Attesting Officer*